United States Patent [19]
Adamis et al.

[11] Patent Number: 5,950,781
[45] Date of Patent: Sep. 14, 1999

[54] METHOD FOR SHIFTING A TWIN-CLUTCH TRANSMISSION AND TWIN-CLUTCH TRANSMISSION ARRANGEMENT

[75] Inventors: Panagiotis Adamis, Wolfsburg; Bernd Cappelmann, Wendeburg-Neubrück; Reinhold Haack, Braunschweig; Harald Ludanek, Calberlah; Ansgar Damm, Gifhorn, all of Germany

[73] Assignee: Volkswagen AG, Wolfsburg, Germany

[21] Appl. No.: 09/181,016

[22] Filed: Oct. 27, 1998

Related U.S. Application Data

[62] Division of application No. 08/903,378, Jul. 30, 1997.

[30] Foreign Application Priority Data

Aug. 8, 1996 [DE] Germany .............................. 196 31 983
Mar. 21, 1997 [DE] Germany .............................. 197 11 820

[51] Int. Cl.$^6$ .................................................... B60K 41/22
[52] U.S. Cl. ......................... 192/3.61; 192/48.8; 74/330; 74/331
[58] Field of Search .............................. 74/325, 331, 333, 74/330; 192/3.58, 3.61, 48.7, 48.8

[56] References Cited

U.S. PATENT DOCUMENTS

| | | | |
|---|---|---|---|
| 4,116,322 | 9/1978 | Ashfield | 192/48.8 |
| 4,463,621 | 8/1984 | Fisher | 74/331 X |
| 4,513,631 | 4/1985 | Koivunen | 74/331 X |
| 4,727,764 | 3/1988 | Klaue | 74/331 |
| 4,738,149 | 4/1988 | Janiszewski | 74/331 X |
| 4,966,048 | 10/1990 | Braun | 74/331 X |
| 4,979,599 | 12/1990 | Nishida | 192/3.58 |
| 4,993,285 | 2/1991 | Asayama et al. | 74/335 |
| 5,429,005 | 7/1995 | Fukui et al. | 74/325 |
| 5,613,401 | 3/1997 | Maurizio | 74/325 |
| 5,720,203 | 2/1998 | Honda et al. | 74/325 |
| 5,823,051 | 10/1998 | Hall, III | 74/325 |

*Primary Examiner*—Charles A. Marmor
*Assistant Examiner*—Saul J. Rodriguez
*Attorney, Agent, or Firm*—Baker & Botts, L.L.P.

[57] ABSTRACT

A twin-clutch transmission having the driving gear wheels of adjacent gears on different transmission input shafts permits skipping one gear stage while shifting gears, i.e. shifting between gears whose driving gear wheels are on the same transmission input shaft, by using an auxiliary gear on the other transmission input shaft to supply a filler torque while shifting between the initial gear and a selected gear.

2 Claims, 3 Drawing Sheets

Fig. 2
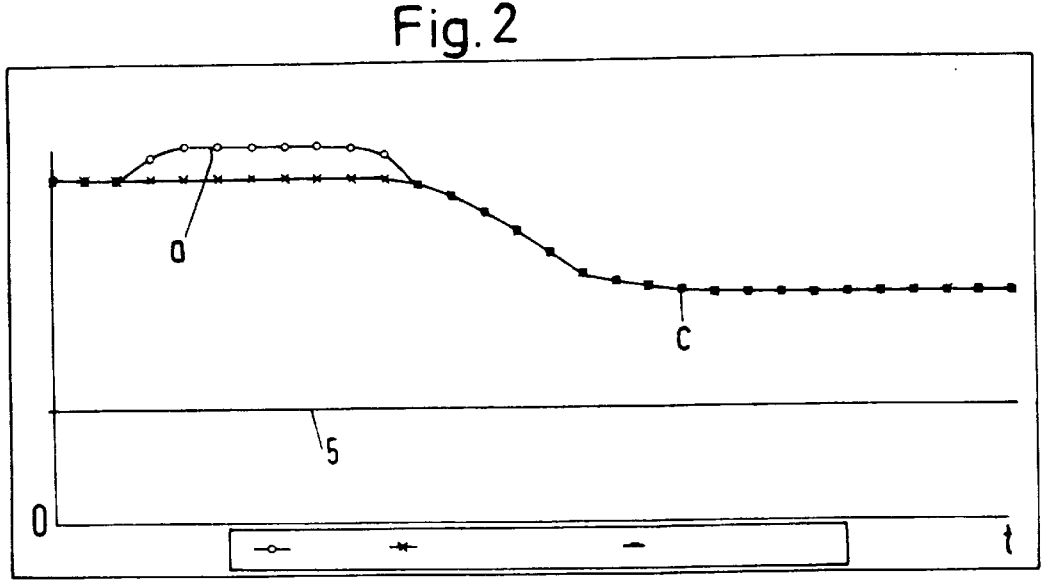
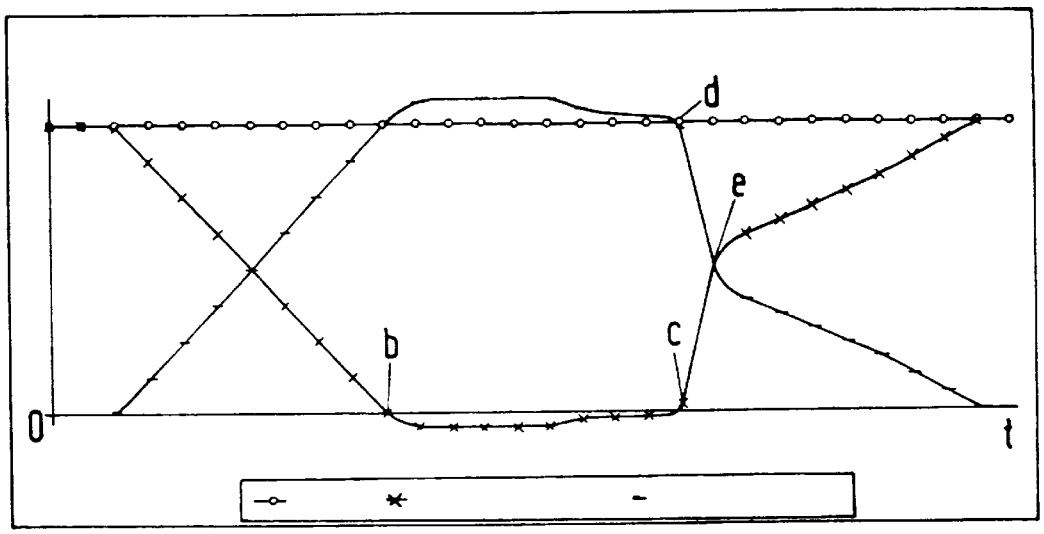
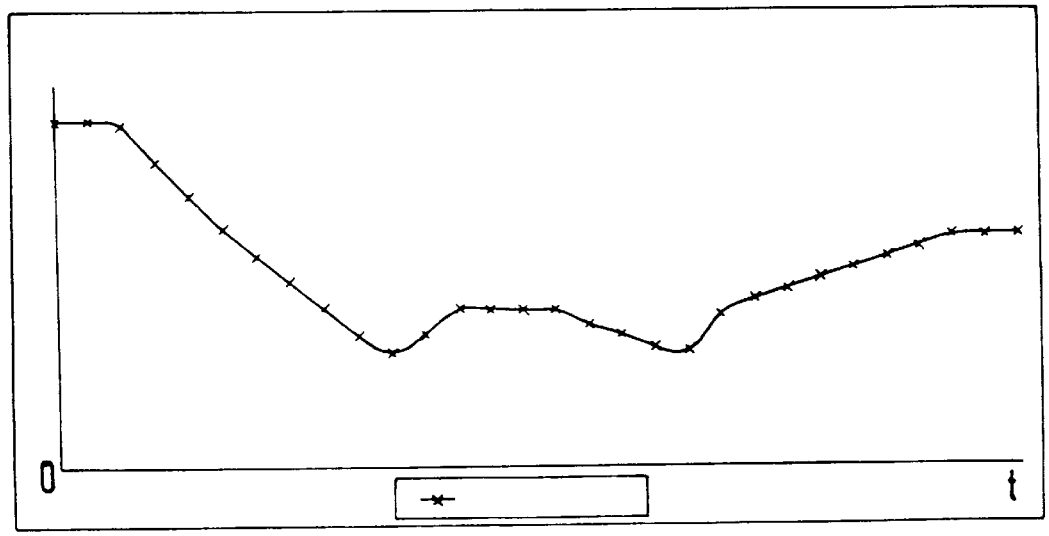

Fig. 3
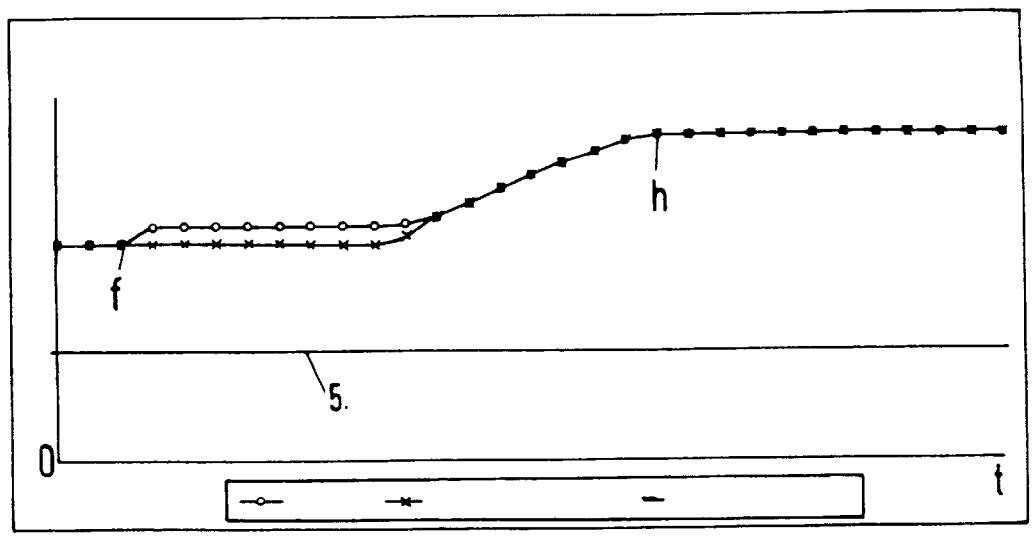
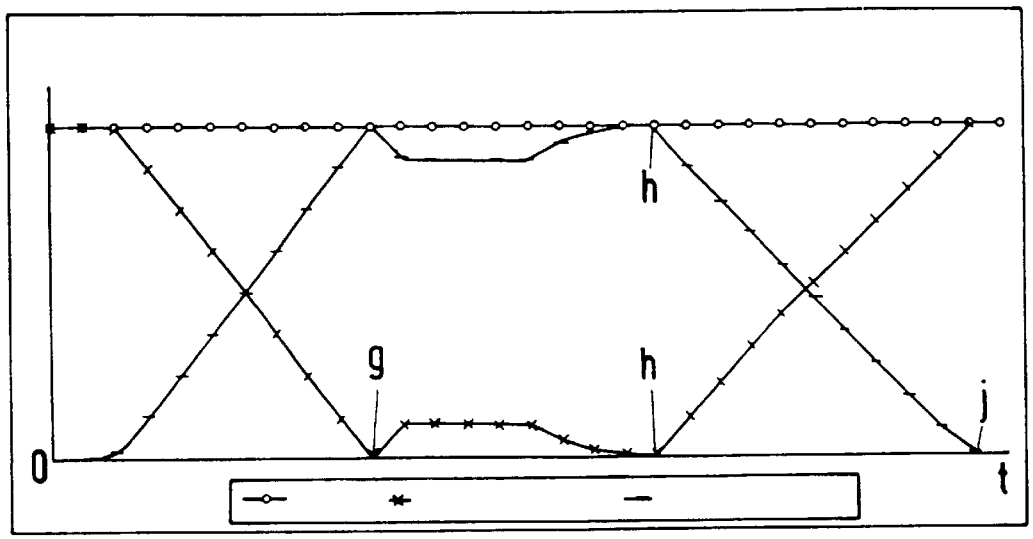
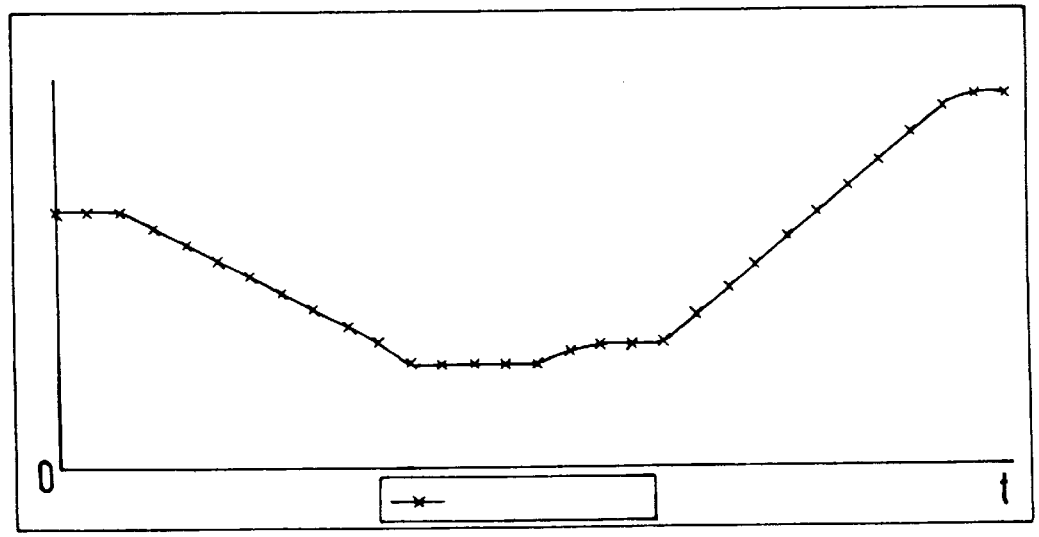

METHOD FOR SHIFTING A TWIN-CLUTCH TRANSMISSION AND TWIN-CLUTCH TRANSMISSION ARRANGEMENT

This is a divisional of copending application Ser. No. 08/903,378 filed Jul. 30, 1997.

BACKGROUND OF THE INVENTION

This invention relates to methods for shifting twin-clutch transmissions having two transmission input shafts and a transmission output shaft, each input shaft having a friction clutch on which initially one of the two clutches transmits an engine torque in a state of static friction and the other clutch is open, the gear selected as the new transmission gear after shifting being on the same transmission input shaft as the original gear.

The invention also relates to a twin-clutch transmission having two transmission input shafts and a transmission output shaft for operation in accordance with a gear-shifting method of the invention.

This application is directed to a modification of the shifting method and transmission arrangement described in the application Ser. No. 08/901,917 filed Jul. 28, 1997, the disclosure of which is incorporated herein by reference. That application is referred to herein as the related application.

In the related application, a method is described for shifting a twin-clutch transmission in which, as an alternative, a first clutch of the two clutches is regulated during the gear-shifting operation in such a way that it is in a state of sliding friction. By appropriate control of the remaining, second clutch, it is possible to assure that the first clutch, for the originally engaged gear, is rendered free from transmitted torque by transferring the engine torque to the second clutch, thus making it possible to disengage the original gear.

It is a well-known disadvantage of twin-clutch transmissions having two transmission shafts, which are generally arranged coaxially with respect to each other, that a gear change which covers two gear stages is not possible directly but can only be effected through a gear situated between the two gears under consideration. Twin-clutch transmissions developed hitherto are generally arranged in such a way that the driving gear wheels of respective adjacent gears are situated on different transmission input shafts. Thus, for example, in the case of a six-speed transmission, the odd-numbered gears are on the first transmission input shaft and the driving gear wheels of the even-numbered gears are on the second transmission input shaft.

With such a transmission and with the gear-change method described in the related application, a driver must therefore shift up or down through the gears in numerical sequence. This is a nuisance, particularly during overtaking when, for example, a driver would like to shift down from fourth gear to second gear in order to produce an increased driving power appropriate to the-traffic situation.

It is, however, an advantage of the gear-shifting method described in the related application that the entire drive train is never without torque during gear changing, so that the entire backlash of the individual components in the drive train, which is cumulative, is always held under stress. From this it follows that banging or other torque jumps, which represent severe discomfort for the vehicle occupants, sub-jectively speaking, cannot occur.

A further major advantage of the twin-clutch transmission and of the gear-shifting method described in the related application is that interruptions in driving power as known from conventional manual transmissions do not occur during gear shifting.

SUMMARY OF THE INVENTION

Accordingly it is an object of the present invention to provide a method and an arrangement for shifting a twin-clutch transmission which overcomes the disadvantages of the prior art.

Another object of the invention to provide a method and arrangement for shifting a twin-clutch transmission which makes it possible to arrange the original gear and the selected gear, i.e. the gear originally engaged and the gear to be engaged, on the same transmission input shaft without losing the advantages of the gear-shifting method which have been described in the related application.

These and other objects of the invention are attained by providing an auxiliary gear on the second transmission input shaft, the transmission ratio of which is higher than that of both of the selected gear and the original gear in order to produce a filler torque.

In the related application, the "first transmission input shaft means the shaft which is transmitting load when the transmission shift is initiated, i.e. the torque-transmitting shaft, and the "second" transmission input shaft means the shaft carrying the selected gear which will be carrying the load after the shifting is completed. In this application, the first transmission input shaft is the shaft carrying both the original gear and the selected gear and the second transmission input shaft is the transmission input shaft which carries the auxiliary gear. The auxiliary gear can be any gear. It is useful to employ the method according to the invention particularly when shifting under traction, in which case it is possible to use, in particular, the higher gears of a transmission as auxiliary gears when gear changes are performed between the lower or middle gears, especially when skipping one or more gears.

In one representative embodiment of a particular method according to the invention, an auxiliary gear on the second shaft is engaged by way of preparation, if it is not already engaged, the transmission ratio of the auxiliary gear being higher than that both of the selected gear and of the original gear; the first clutch is opened in a regulated manner by a slip controller to the extent that it operates at the slip limit; the second clutch is closed in a controlled manner until the first clutch, which is operated at the slip limit by the slip controller, no longer transmits any torque, and, instead, a filler torque is transmitted by the auxiliary gear; the first clutch is then fully opened, so that the second clutch transmits the engine power by itself; the original gear is disengaged without loss of transmitted torque; the first clutch is closed again; the first shaft is brought to the synchronization speed of the selected gear by the auxiliary gear and by appropriate regulation of the second clutch, i.e. closing when shifting up and opening when shifting down; the selected gear is engaged when the first transmission shaft is at the synchronous speed and the second clutch is opened in a regulated manner so that the first clutch transmits torque until the first clutch is again transmitting the entire engine torque.

In an alternative embodiment of a method according to the invention, an auxiliary gear on the second shaft is engaged by way of preparation, if not already engaged, the transmission ratio of the auxiliary gear being higher than that both of the selected gear and of the original gear; the second clutch is closed in a regulated manner by a slip controller to the extent that it operates at the slip limit; the first clutch is opened in a controlled manner until the second clutch, which is operated at the slip limit by the slip controller, is transmitting the full torque from the engine; the second clutch is then fully closed so that the second clutch transmits the engine power by itself; the original gear is disengaged essentially without loss of transmitted torque; the first clutch is closed again; the first shaft is brought to the synchronization speed of the selected gear by the auxiliary gear and by appropriate regulation of the second clutch, i.e. closure when shifting up and opening when shifting down; the selected gear is engaged when the first transmission shaft is at the synchronous speed and the second clutch is opened in a regulated manner, so that the first clutch transmits torque until the first clutch is again transmitting the entire engine torque.

A comparison with the related application, which describes two alternative methods of equal status for changing from a gear on the first transmission input shaft to a gear on the second transmission input shaft shows that the method in accordance with the related application is used in the first part of the present method for shifting to the auxiliary gear. When shifting up or down under traction, the auxiliary gear will be one of the higher gears, which, with the clutch in a state of sliding friction, i.e. slipping, is capable of applying at least a "filler torque" to the drive wheels, thus eliminating troublesome interruptions to the torque applied through the drive train.

In order then to be able to shift from the auxiliary gear to the selected gear, it is necessary to bring the first transmission input shaft to its synchronization speed. For this purpose, the first clutch is closed again. By appropriate control or regulation of the second clutch, it is possible either to accelerate the first transmission input shaft, which carries the gear to be selected, or the driving gear wheel of the corresponding gear wheel pair when the intention is to shift to a lower gear, or to brake the first transmission input shaft when the intention is to shift to a higher gear.

To do this, the second clutch is closed for braking or opened for acceleration, so that, by the elimination of the torque transmitted through the second clutch, the rotational energy stored in the moment of inertia of the engine produces an increase in the engine speed, which is transmitted through the closed first clutch to the first transmission input shaft to be synchronized, which carries the gear to be selected.

It is theoretically conceivable to employ this method, for example, on a 6-speed transmission in which only the sixth transmission gear is on the second transmission input shaft, so that gear shifting is possible between all conceivable pair combinations of the lower five gears, the driving gear wheels of which are all on the first transmission input shaft. However, there is difficulty in this case that the spread of the lower gears is considerably greater than that of the upper gears, so that it may not be possible to use the sixth gear as an auxiliary gear when shifting, for example, from first to third gear.

In a preferred embodiment of a twin-clutch transmission according to the invention, the second and sixth transmission gears are arranged on the second transmission input shaft, while the first, third, fourth and fifth gears are on the first transmission input shaft.

With this arrangement, shifting among the lower three gears is possible only between adjacent gears in accordance with the method described in the related application. Between gears 3, 4 and 5, unlimited shifting is possible, and, in accordance with the present application, the highest gear is used as an auxiliary gear. A readily accomplished shift through several gears is thus made possible in a transmission gear range in which overtaking maneuvers are usually performed.

BRIEF DESCRIPTION OF THE DRAWINGS

Further objects and advantages of the invention will be apparent from a reading of the following description in conjunction with the accompanying drawings, in which:

FIG. 2 is a graphical representation showing the variation in the engine and transmission input speeds, the engine and transmission input torques and the transmission output torque for shifting up under traction from second gear to fourth gear, the fifth gear being used as an auxiliary gear; and FIG. 3 is a graphical representation showing the variation in the engine and transmission input speeds, the engine and transmission input torques and the transmission output torque for shifting down from fourth to second gear in overrun, the fifth gear being used as an auxiliary gear.

DESCRIPTION OF PREFERRED EMBODIMENTS

Figure 1:
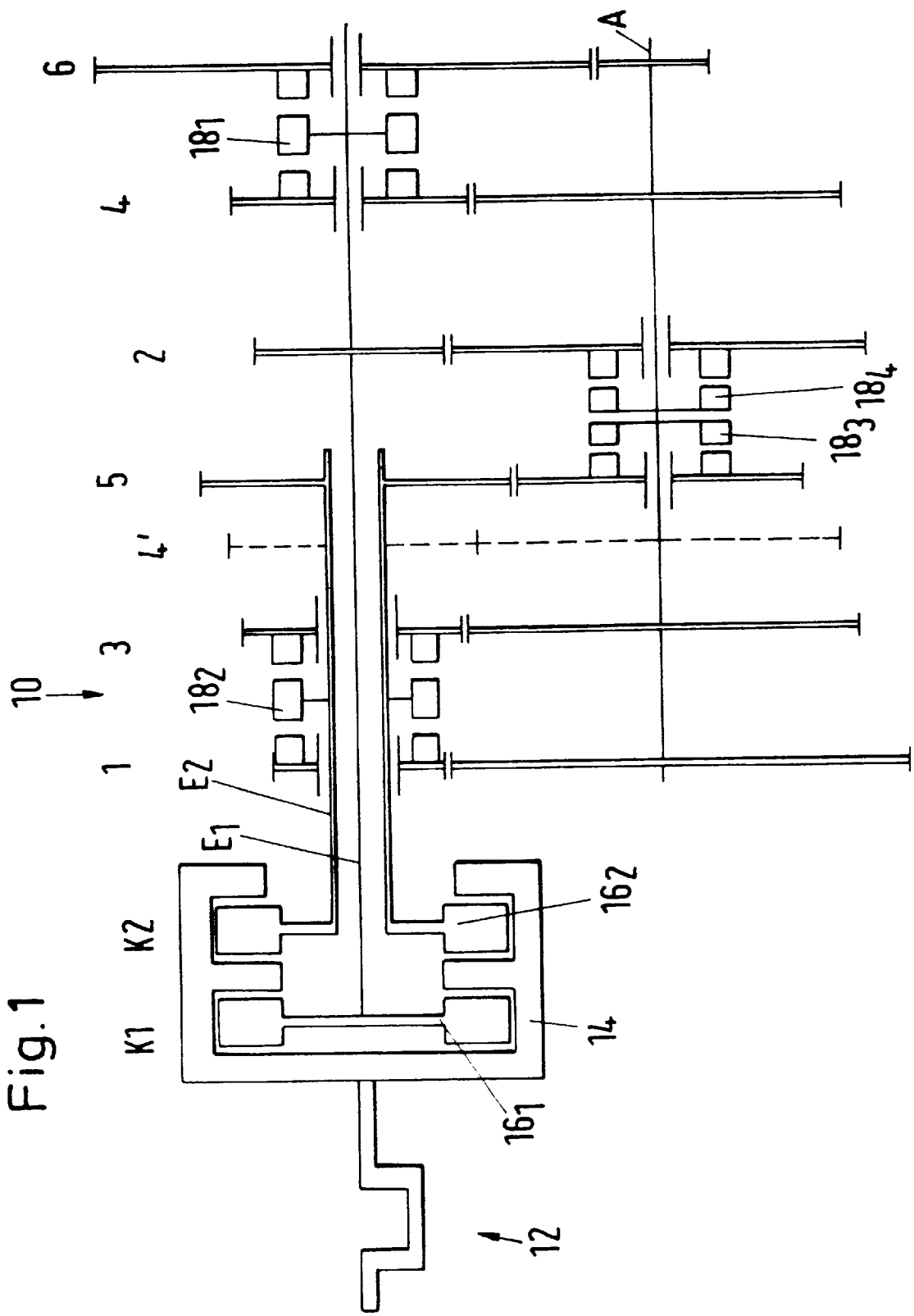
FIG. 1 is a schematic illustration showing a representative embodiment of a twin-clutch transmission according to the invention with a variant, depicted in broken lines, relating to the fourth gear.

In the typical embodiment of the invention shown schematically in FIG. 1, a twin-clutch transmission 10 is essentially the same as the twin-clutch transmission in accordance with FIG. 1 of the related application. Only the friction-wheel mechanisms $RG_1$ and $RG_2$ of the related application have been omitted for the sake of clarity.

The twin-clutch transmission 10 is driven by an internal combustion engine, which is symbolized by its crankshaft 12. Two clutches $K_1$ and $K_2$ have a common outer clutch cage 14 driven by the engine and are arranged concentrically adjacent to one another. Connected to the clutch friction plates $16_1$ and $16_2$ are two transmission input shafts $E_1$ and $E_2$. The transmission input shaft $E_2$ is a hollow shaft and surrounds the transmission input shaft $E_1$.

The individual transmission gears are represented by a total of six gear wheel pairs 1–6. The input wheels of the second and fifth gears are rigidly connected to the input shafts $E_1$ and $E_2$, respectively, while the input wheels of the first, third, fourth and sixth gears are floating wheels which are supported by needle bearings and can be actuated by dogs on sliding sleeves $18_1$, and $18_2$.

A transmission output shaft A carries a total of six output wheels, the output wheels of second and fifth transmission gears being floating wheels and being capable of being shifted by two independent sliding sleeves $18_3$ and $18_4$. The output wheels of the first, third, fourth and sixth transmission gears are rigidly connected to the transmission output shaft A.

In first transmission gear, power is transmitted through the closed clutch $K_2$, the transmission input shaft $E_2$, the sliding sleeve $18_2$ and the input wheel of the first transmission gear to the output wheel of the first transmission gear and the transmission output shaft A.

With the clutch $K_2$ engaged and the sliding sleeve $18_2$ displaced to the right, the third transmission gear is engaged while, with the clutch $K_2$ engaged and the sliding sleeve $18_3$ in the left-hand position, the fifth transmission gear is engaged.

Similarly, with the clutch $K_1$ engaged but the clutch $K_2$ opened, one of the second, fourth and sixth transmission gears is engaged, depending on the positions of the sliding sleeves $18_1$, $18_2$ and $18_4$.

As mentioned previously, the clutch which transmits the engine power in the initial state prior to the shifting operation, i.e. the clutch which is essentially in the engaged state, which is a state of static friction, is the first clutch, while the clutch which is associated with the auxiliary gear is in each case the second clutch. In contrast to the arrangement described in the related application, the original gear and the selected gear are on the same transmission input shaft in the gear-shift method of the present application, which, in the examples illustrated, is the transmission input shaft $E_1$. However, this choice is not intended to imply any limitation.

The possible gear-shifting operations are explained below with reference to FIGS. 2 and 3, the shift being in each case between the second and fourth gears, while the fifth gear, which is on the second transmission input shaft $E_2$, is used as an auxiliary gear. In each of these drawings the upper illustration shows the changes in engine and transmission input shaft speeds with time, the center illustration shows the changes in engine and transmission input shaft torques with time and the lower illustration shows the changes in transmission output shaft torque with time, the engine curve being marked with "o", the original gear input shaft curve being marked by "x" and the auxiliary gear shaft curve being marked with "-".

For all the examples, the following fundamental considerations apply: with twin clutch transmissions, it is possible, with the gears engaged, for both clutches to be in engagement. Nevertheless, it is only possible for one clutch to be in a state of static friction. Permissible operating states are those in which either one clutch is in a state of static friction and the other clutch is in a state of sliding friction, or both clutches are in a state of sliding friction.

For each individual clutch, the following applies:

a) If one clutch is in a state of sliding friction and the engine speed is greater than the corresponding transmission input shaft speed, a positive torque, i.e. a torque which drives the vehicle, is applied to the transmission input shaft.

b) If one clutch is in a state of sliding friction and the engine speed is less than the corresponding transmission input shaft speed, a negative torque, i.e. a torque which brakes the vehicle, is applied to the transmission input shaft.

Where both clutches of a twin-clutch transmission are in a state of sliding friction, the following applies:

a) If the engine speed is greater than the transmission input speed of the lower gear, both transmission input shafts transmit positive torque.

b) If the engine speed is less than the transmission input speed of the higher gear, both transmission input shafts transmit negative torque.

c) If the lower gear is in a state of static friction, the higher gear transmits positive torque.

The lower gear is always the one with the higher transmission input speed.

In FIGS. 2 and 3 of the drawings, the following simplifications have been made:

a) No vehicle acceleration during the gear-shifting operation has been indicated.

b) No change in the torque of the engine due to a change in speed upon introduction of permanent slip has been indicated.

c) No change in torque due to a change in the speed of the engine during the gear-shifting operations under traction has been indicated.

FIG. 2 shows shifting up under traction, i.e. the engine is supplying a positive torque to the transmission. Without limiting the generality, it should be assumed in connection with this example that the transmission is initially being operated in second gear, i.e. the clutch $K_1$ of the lower gear 2 is in a state of static friction. The selected gear is the fourth gear, i.e. one gear stage is to be skipped. The selected gear 4 is on the same transmission input shaft $E_1$ as the original gear 2, and it is thus not possible to employ the method described in the related application. Referring to FIG. 1, power initially flows from the internal combustion engine 12 through the clutch $K_1$ to the transmission input shaft $E_1$ and through the gear wheel pair of the second transmission gear and the sliding sleeve $18_4$ to the transmission output shaft A.

Assuming for this example that the fifth gear has been selected as the auxiliary gear, the sliding sleeve $18_3$ has been shifted into the locking position, i.e. to the left in FIG. 1. The fifth gear is selected as an auxiliary gear in anticipation that the driver may not want to change from second gear to third gear in accordance with the gear-shifting method of the related application but wants to skip third gear and change to fourth gear so that fifth gear will be available as an auxiliary gear immediately.

With the clutch $K_2$ opened, the transmission input shaft $E_2$ is rotated by the fifth gear without being subject to driving torque.

In accordance with the principles of the related application, the torque can be removed from the second gear by shifting the driving torque to fifth gear, which is already engaged, by appropriate control of the clutches $K_1$ and $K_2$. Alternative procedures are also possible.

Let it be assumed that the clutch $K_1$ is being maintained at the limit of static friction, i.e. in a state of sliding friction, by a slip controller, producing a slight rise in the engine speed denoted by "a" in the upper illustration in FIG. 2.

At a later time b, as shown in the central illustration in FIG. 2, the entire driving torque has been shifted from the clutch $K_1$ of second transmission gear to the clutch $K_2$ of fifth transmission gear, i.e. clutch $K_1$, the first clutch, is free from torque, while the second clutch transmits the entire torque from the engine. The second transmission gear can then be disengaged with no change in transmitted torque, i.e. without a jerk. The transmission output torque then falls in accordance with the change in the transmission ratio between second and fifth gear, as the lower illustration in FIG. 2 shows. However, the transmission output torque does not collapse completely, as is the case with conventional manual transmissions. On the contrary, a supporting torque or "filler torque" continues to be supplied to the driving wheels by the fifth gear as an auxiliary gear.

In the subsequent, second phase of the method according to the present invention, the transmission input shaft $E_1$ is brought to the synchronization speed of the fourth gear. For this purpose, the clutch $K_1$ is fully closed again. The clutch $K_1$ thus provides a connection between the first transmission input shaft $E_1$ and the crankshaft 12, with the result that the transmission input shaft $E_1$ rotates at the engine speed. By further closing of the clutch $K_2$, the engine is braked by application of a negative torque to the transmission input shaft $E_1$, which is thus negatively accelerated, i.e. braked. The central illustration in FIG. 2 shows that the torque applied to the shaft of the initial gear, i.e. applied to the transmission input shaft $E_1$ in the present example, becomes negative, showing that the shaft $E_1$ is braked. At the time c, the transmission input shaft $E_1$ has reached the synchronization speed of the fourth gear and fourth gear can then be engaged in a manner free from torque changes as the central illustration in FIG. 2 shows.

The interrelationship of the upper and central illustrations in FIG. 2 demonstrates a further relationship which is important to the invention. The downward slope of the curve of the transmission input shaft speed in the upper illustration between the speeds in second gear and fourth gear corresponds to a gradient, i.e. dw/dt. This gradient is proportional to the braking torque acting on the transmission input shaft in the central illustration between the times b and c. From the necessary gradient between the speeds in second and fourth gear, it is therefore possible to derive a measure of the braking torque and thus a control strategy for the clutch $K_2$. Corresponding control strategies with numerous modifications are conceivable, and these all fall within the scope of this invention.

At the time d, the clutch $K_2$ is opened abruptly to a certain extent, this being equivalent to a negative torque jump which, in turn, corresponds to a positive torque jump at the transmission input shaft $E_1$ since the engine torque is shifted back from the clutch $K_2$ to the clutch $K_1$. It has been found that such a torque jump is useful particularly when shifting up. At the time e, the clutch $K_2$ is then opened continuously in accordance with a ramp until the entire engine torque supplied by the crankshaft 12 is again being transmitted through the clutch $K_1$ into the fourth gear.

FIG. 3 shows the example of shifting down from fourth gear to second gear while skipping the third gear.

It should be assumed, as in the case of the example explained above of shifting up from second gear to fourth gear, that the fifth gear has already been engaged in anticipation, i.e. the sliding sleeve $18_3$ is in the locking position, i.e. in the left-hand position. The sliding sleeve $18_1$, has thus selected the fourth gear and the engine torque is being transmitted through the clutch $K_1$, and the transmission input shaft $E_1$ by way of the fourth gear to the transmission output shaft A.

According to the upper illustration in FIG. 3, the clutch $K_1$, is opened partially into a state of sliding friction at the time f and is regulated to a desired speed, corresponding to a slight increase in the engine speed in the upper illustration in FIG. 3. By a slow controlled or regulated closure of the clutch $K_2$, while the clutch $K_1$, continues to be regulated to the same speed, the engine torque is shifted continuously from the clutch $K_1$ to the clutch $K_2$, as the central illustration in FIG. 3 shows, until the clutch $K_1$ is transmitting no torque at the time g and the fourth gear can be disengaged without any jerk by a corresponding release of the sliding sleeve $18_1$.

The clutch $K_1$ is then closed again, so that the transmission input shaft $E_1$ rotates at the same speed as the engine. It is now necessary to accelerate the transmission input shaft $E_1$ to the synchronization speed of the second gear in order to be able to engage the latter. For this purpose, the clutch $K_2$ is opened further, so that the engine speed increases, while the power regulating element of the engine remains unchanged.

Furthermore, the rotational energy stored in the entire moment of inertia of the engine is converted into higher speeds. Accordingly, as shown in the central illustration in FIG. 3, a positive torque is applied to the transmission input shaft $E_1$ between the times g and h and accelerates that shaft until, at the time h, it has reached the synchronization speed of the second gear and the gear can accordingly be engaged by actuation of the sliding sleeve $18_4$.

What has already been explained above with reference to FIG. 2 about the relationship between the speed gradient dw/dt between the times g and h of the disengagement of the original gear and the engagement of the selected gear also applies in this case. Between the times g and h, a specifiable positive speed gradient dw/dt is necessary, this being proportional to the torque applied between times g and h. From this it is possible to derive appropriate control strategies for the clutch $K_2$.

After engagement of fourth gear at the time h, the clutch $K_2$ is opened in accordance with a ramp, this corresponding to a continuously decreasing transmissible engine torque. At the time i, the entire engine torque has been shifted back from the clutch $K_2$ to the clutch $K_1$ which drives the transmission input shaft $E_1$.

As the lower illustration of the transmission output torque in FIG. 3 shows, the torque driving the vehicle has never collapsed to zero since a filler torque is supplied from the fifth gear as an auxiliary gear between the times g and h.

It is advantageous, in particular, that the entire drive line is never without torque, so that the total backlash between the individual components does not have a noticeable negative effect, for example in the form of impacts, which represent subjective discomfort for the vehicle occupants.

FIG. 1 furthermore shows an alternative embodiment of the transmission according to the invention, in which only the second and sixth gears are on the second transmission input shaft $E_2$. The fourth gear designated 4' is on the first transmission input shaft $E_1$, as indicated in dashed lines.

This arrangement offers the advantage that slot selection and the mechanical design of the actuating elements for gear shifting is simpler to implement with only the second and sixth gears on the second transmission input shaft. It would also be conceivable, theoretically, to have the first and fifth gears on the transmission input shaft $E_1$ and to have only the sixth gear on the transmission input shaft $E_2$ in order to further simplify the design of the transmission. However, there are difficulties with this inasmuch as it would then be necessary to perform the gear-shifting operations in the lower gears 1, 2 and 3 with the aid of the sixth gear as auxiliary gear in each case. This is disadvantageous because the spread of the upper gears is comparatively narrow but there is a considerable jump to the lower gears. A gear change from first to second gear and from second to third gear involving interim use of the sixth gear or, in the case of a five-speed transmission, using the fifth gear, would not be possible in practice due to the large differences in the transmission ratio.

The variant indicated in FIG. 1 with the gear 4' therefore represents a preferred compromise. Between the gears 1, 2 and 3, shifts occur only to an adjacent gear since these are arranged on different transmission input shafts $E_1$ and $E_2$. Here, a gear-shifting method corresponding to the related application is used. It is possible to shift among the gears 3, 4 and 5 using the sixth gear as an auxiliary gear, making possible gear jumps, from third to fifth gear for example. A shift directly from second to fourth gear is likewise possible although no auxiliary gear is required, it being possible to work directly with the method as described in the related application.

Although the invention has been described herein with reference to specific embodiments, many modifications and variations will readily occur to those skilled in the art. Accordingly, all such variations and modifications are included within the intended scope of the invention.

We claim:

1. A twin-clutch transmission comprising a first transmission input shaft carrying an originally engaged gear and a selected gear to be engaged after shifting, a second transmission input shaft carrying an auxiliary gear having a higher gear ratio than either the originally engaged gear or the selected gear to be engaged after shifting, each transmission input shaft having an associated clutch, and a transmission output shaft, wherein the driving gear wheels of at least three transmission gears are on the first transmission input shaft and the driving gear wheels of only two transmission gears are on the second transmission input shaft.

2. A twin-clutch transmission according to claim 1 having six transmission gears with six gear wheel pairs and wherein the driving gear wheels of the first, third, fourth and fifth transmission gears are on the first transmission input shaft and the driving gear wheels of the second and sixth transmission gears are on the second transmission input shaft.

* * * * *